Aug. 1, 1939.  E. R. SMOLEY  2,167,730

SOLVENT EXTRACTION AND RECOVERY

Filed Oct. 4, 1935  2 Sheets-Sheet 1

Witness
Paul F. Bryant

Inventor
Eugene R. Smoley
by his attorneys

Aug. 1, 1939.   E. R. SMOLEY   2,167,730
SOLVENT EXTRACTION AND RECOVERY
Filed Oct. 4, 1935   2 Sheets-Sheet 2

Patented Aug. 1, 1939

2,167,730

UNITED STATES PATENT OFFICE 2,167,730

SOLVENT EXTRACTION AND RECOVERY

Eugene R. Smoley, New York, N. Y., assignor to The Lummus Company, New York, N. Y., a corporation of Delaware Application October 4, 1935, Serial No. 43,531

12 Claims. (Cl. 196—13)

The present invention relates to methods and apparatus for solvent extraction and recovery, and more particularly to systems in which a liquid material is subjected to the selective dissolving action of a suitable solvent, followed by recovery of the solvent from the resulting mixture or mixtures. A typical example is the solvent refining of petroleum oils, in which an organic solvent, such as phenol, cresylic acid or furfural has a predominant dissolving action on the naphthenic components of the oil. In any case, substantially complete recovery of the solvent is essential for reasons of economy, and furthermore, it is necessary to reduce the proportion of water in the recovered solvent below a certain limit of tolerance. Since most of the useful solvents form constant boiling mixtures with water, and since water is certain to be introduced into the system, either in a steam distillation step or from an external source, there is usually considerable difficulty in realizing the condition of complete recovery of solvent uncontaminated by water.

The principal object of the present invention is to provide a method and apparatus for solvent extraction and recovery, wherein the proportion of water in the recovered solvent may be simply and effectively reduced below a predetermined minimum. To this end the present invention comprises the method and apparatus hereinafter described and particularly defined in the claims.

Figure 1:
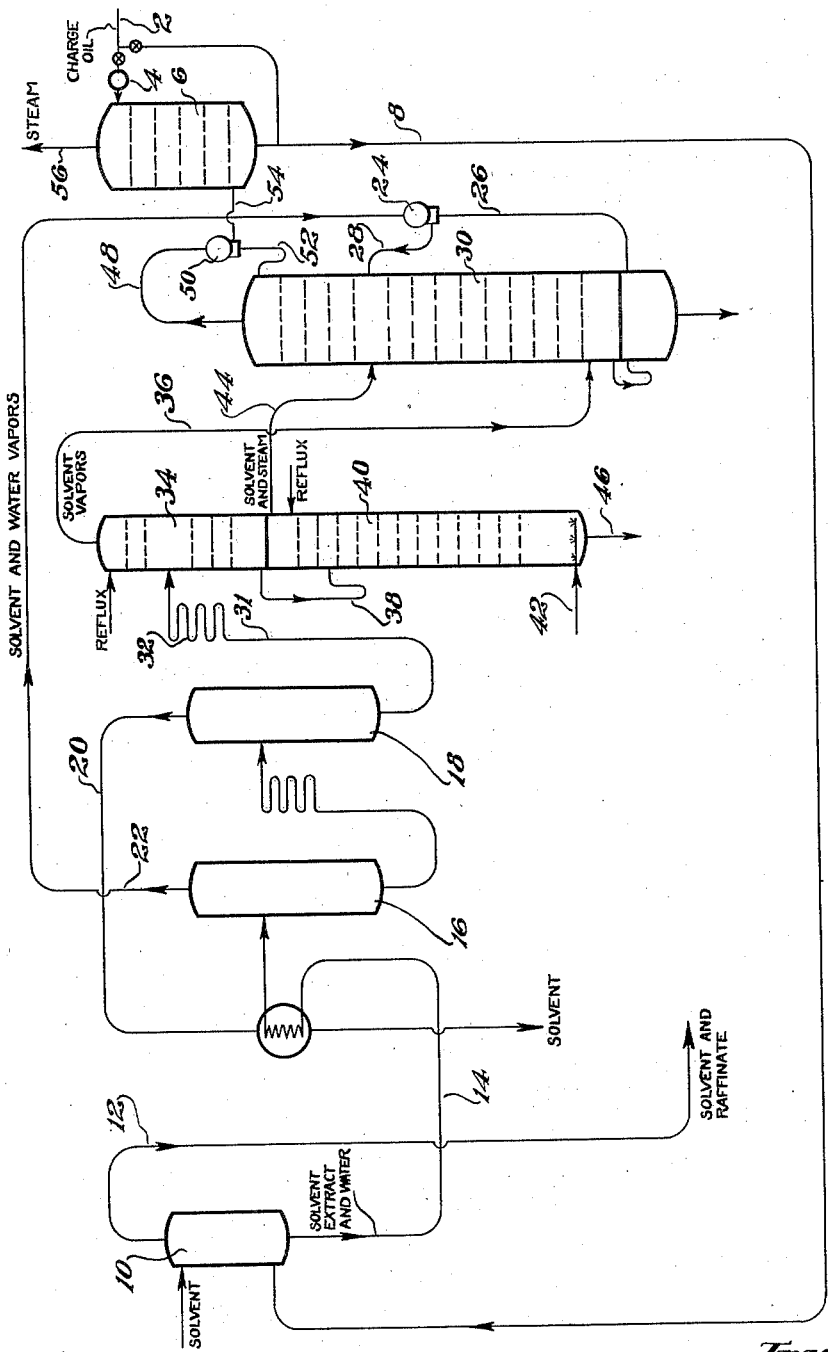
Figure 2:
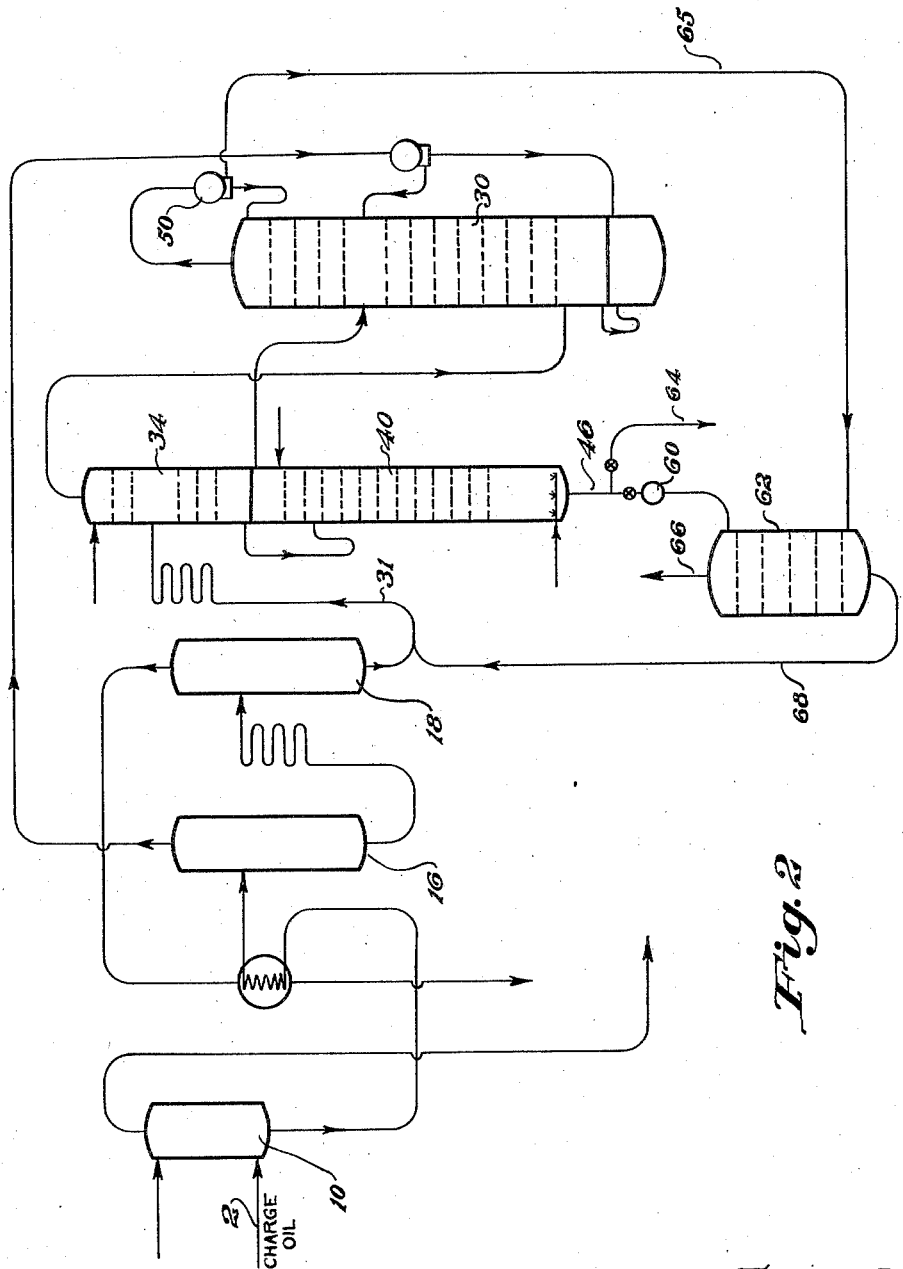

In the accompanying drawings, Fig. 1 is a diagram of one form of apparatus for practising the present invention, and Fig. 2 is a diagram of apparatus for practising a modified process.

Although the invention is applicable to any process in which a liquid is subjected to a selective solvent action, it is herein illustrated and described as applied to the solvent refining of petroleum oils. The charge oil is introduced at 2 and a portion is passed through a heater or cooler 4 and a scrubber 6 for a purpose later to be described. The streams are joined and are conveyed by a pipe 8 to the solvent extraction apparatus 10 into which solvent is introduced at the top. As a result of the extraction, there are obtained two streams designated 12 and 14. The stream 12 is a mixture of raffinate (mainly paraffinic oils) with some solvent, and the stream 14 is a mixture of extract (mainly naphthenic oils) with a considerable amount of solvent. The stream 14 may contain 1% or more of water which has been externally introduced, as by it's presence in the oil, from leaks in water cooled equipment, or from accumulations formed by steaming of the equipment during a shutdown. The solvent itself may carry some water, up to the limit of tolerance (possibly 0.5%) but since this water is continuously recycled with the solvent, its effect may be neglected.

The streams 12 and 14 are then passed to suitable distilling equipment for removal of the solvent. Only the distillation of the stream 14 will be described since the distillation of solvent from the stream 12 is similar, and relatively simple. The stream 14 is passed successively through distilling columns 16 and 18 of the type disclosed in my co-pending application Serial No. 23,828, filed May 28, 1935. The bulk of the dry solvent is obtained from the column 18 in a stream 20. Vapors of solvent with such water as may have been originally present are taken off the column 16 by a pipe 22. These vapors are partially condensed in a condenser 24 to recover substantially dry solvent liquid at 26, while the uncondensed vapors are passed by a pipe 28 to a dehydrating column 30.

The residue from the column 18 comprises the extracted oils with a small amount of solvent. For removal of the solvent, the residue is passed by a line 31 through a heater 32 into a column 34, from which solvent vapors pass by a pipe 36 to the bottom of the column 30 for supplying heat to the latter. The residue from the column 34 is passed by a pipe 38 into a stripping column 40 which may be integral with the column 34. Steam is introduced at 42 into the bottom of the column 40 and vapors of solvent and stripping steam pass from the column 40 by a vapor pipe 44 into the dehydrating column 30. The extract, substantially free of solvent, is removed from the column 40 at 46.

Vapors of solvent and stripping steam resulting from a parallel distillation of the solvent-raffinate stream 12 may also be introduced into the column 30, as described in the co-pending application of Kraft, Serial No. 24,308, filed May 31, 1935.

The fractionation in the column 30 results in a separation between dry solvent as residue and a constant boiling mixture of solvent and water as distillate. The constant boiling vapors are taken off the column at 48 and partially condensed at 50 to provide reflux which is introduced into the column at 52, while the uncondensed vapors, representing the net distillate of the constant boiling mixture, continue through a vapor pipe 54. The quantity of constant boiling mixture is determined by the amount of water present in the system, namely, the amount of stripping steam used for separating the solvent from the extract and the raffinate, plus such water as may have been introduced from the external sources above referred to. The amount of solvent in the constant boiling mixture depends on the characteristics of the materials. For example, with cresylic acid as solvent, the constant boiling mixture contains only about 6% of solvent, while with furfural, the constant boiling mixture contains about 35% of solvent. It will be understood that the minimum quantity of distillate vapors is obtained when the fractionation is precisely controlled to give only the constant boiling vapors. In actual practice, such precision is unnecessary and the vapors may contain somewhat more solvent than would be accounted for in the constant boiling mixture, it being merely essential to assure that all of the water above the prescribed tolerance is removed from the residue.

The net vapors of the constant boiling mixture are passed by the line 54 into the scrubber 6. This scrubber has suitable decks or other contact devices to promote contact between the ascending vapors and the descending charge oil. The charge oil passing through the scrubber should be at a temperature above the boiling point of water, so that no steam will be condensed. The preferred temperature is about 250–300° F., in which range the oil has a decided absorbing action on the solvent without appreciable condensation of steam or vaporization of oils. The temperature is brought to the proper value by the temperature control apparatus 4, which may be either a heater or cooler, depending on the temperature of the charge oil. Practically all of the solvent may be removed from the steam by this method. If desired, all of the charge oil may be used to scrub the vapors, but this is usually unnecessary, since the quantity of solvent in the vapors is small, being ordinarily less than 1% of the total solvent in the system.

The steam continues out through the scrubber at 56, substantially free of solvent, and may be re-used for stripping steam in the column 40 as well as in the column for stripping the solvent from the raffinate. In this steam is localized the water in the process above the limit of tolerance, and if the water introduced from all external sources is greater than the loss of steam in the system, some of the steam may have to be wasted to prevent its building up in the system. This wastage, however, is of no consequence, because it entails no waste of solvent.

The charge oil passed to the extraction apparatus contains a small quantity of absorbed solvent, but this in no way affects the extraction step.

According to a modified procedure, the solvent contained in the constant boiling mixture is absorbed in a finished oil product of the process, either extract or raffinate. This is shown in Fig. 2, wherein the charge oil is run direct by the line 2 into the extraction apparatus 10. The equipment designated at 16, 18, 30, 34, 40 and 50 is the same as in Fig. 1. A part of the extract withdrawn at 46 as the final residue of the distillation is passed through a cooler 60 to the scrubber 62 which is similar to the scrubber 6 of Fig. 1, the remainder of the extract being withdrawn as a product at 64. The constant boiling vapors leaving the reflux condenser 50 are run to the scrubber through a line 65. The solvent is removed from the vapors and the steam leaves the scrubber at 66. The absorbing oil and the absorbed solvent are cycled from the scrubber back to the distilling step by a line 68 which joins the line 31 running to the column 34. This process slightly increases the duty on the columns 34 and 40, but it offers the advantage that the extract, having been taken direct from a distillation step, is already at temperature approximately suitable for scrubbing, requiring the removal of no considerable heat at 60 to lower it to the temperature necessary for absorption of the solvent without condensation of steam.

A part of the finished raffinate stream may be used instead of extract for absorption, since at the temperature necessary to prevent condensation of steam, the raffinate and solvent are sufficiently miscible, but usually the extract is to be preferred as the absorbing agent, to avoid redistillation of the high-grade raffinate.

The column 30 and the scrubber, in either form of the invention, may be operated under a pressure differing from atmospheric. In vacuum operation, the absorbing agent, whether charge oil or a finished oil product, may be relatively cool, because of the lower condensing point of the steam. Under super-atmospheric pressure, the absorbing agent must be at a higher temperature to prevent steam condensation, and this may be advantageous in promoting the absorbing action. In any event, reference to the boiling point of water or the condensing point of steam applies to the boiling or condensing point under the pressure existing in the scrubber.

The invention may be modified within the limits of practical convenience. For example, it has already been stated that the fractionation in the dehydrating column 30 need not be perfect, and the vapors may contain some solvent in addition to what is contained in the constant boiling mixture. Similarly, it is not essential to effect an absolutely complete removal of the solvent from the vapors in the scrubber. If the steam is to be re-used as stripping steam, it is only necessary to reduce the concentration of solvent to such a value that its partial pressure is sufficiently low to have no appreciable effect on the steam stripping operation. In such a case, if excess steam is wasted, as above described, some solvent will be lost with it, but the waste is so small and the solvent concentration is so low, that the loss will be entirely negligible.

Having thus described the invention, what is claimed is:

1. In a solvent extraction and recovery system wherein a charge liquid is subjected to an extraction step by contact with a solvent liquid, the solvent being of a character to form a constant boiling mixture with water, the steps which consist in steam distilling solvent from a mixture resulting from the extraction step to form a constant boiling vapor mixture of solvent and water, and contacting the vapor mixture with charge liquid at a temperature above that at which steam will condense to absorb substantially all of the solvent from the vapors.

2. In a solvent extraction and recovery system wherein a charge liquid is subjected to an extraction step by contact with a solvent liquid, the solvent being of a character to form a constant boiling mixture with water, the steps which consist in distilling solvent from a mixture resulting from the extraction step, said distillation being effected in part with steam, whereby constant boiling vapors of solvent and water are formed, and contacting the vapors with charge liquid at a temperature above the condensing point of steam to absorb substantially all of the solvent from the vapors.

3. In solvent refining of petroleum oils wherein a charge oil is subjected to an extraction step by contact with a solvent which is of a character to form a constant boiling mixture with water, the steps which consist in steam distilling solvent from a solvent-oil mixture resulting from the extraction step to form constant boiling vapors of solvent and water, and contacting the vapors with charge oil at a temperature above that at which steam will condense to absorb substantially all of the solvent from the vapors.

4. In a solvent extraction and recovery system wherein a charge liquid is subjected to an extraction step by contact with a solvent liquid, the solvent being of a character to form a constant boiling mixture with water, the steps which consist in distilling solvent from a mixture resulting from the extraction step, said distillation being effected in part with steam, the system containing water introduced from an external source, whereby constant boiling vapors of solvent and water are formed, contacting the vapors with charge liquid to absorb substantially all of the solvent while leaving steam uncondensed, and wasting a portion of the recovered steam in excess of that required for the distillation step.

5. In solvent refining of petroleum oils wherein a charge oil is subjected to an extraction step by contact with a solvent which is of a character to form a constant boiling mixture with water, the steps which consist in steam distilling solvent from a solvent-oil mixture resulting from the extraction step to form constant boiling vapors of solvent and water, and contacting the vapors with a petroleum oil to absorb substantially all of the solvent from the vapors, said petroleum oil being at a temperature above the condensing point of steam, and cycling the oil and absorbed solvent into the process.

6. In a solvent extraction and recovery system wherein a charge liquid is subjected to an extraction step by contact with a solvent liquid, the solvent being of a character to form a constant boiling mixture with water, the steps which consist in steam distilling solvent from a mixture resulting from the extraction step to form a constant boiling vapor mixture of solvent and water, contacting the vapor mixture with a part of the residue of the distilling step at a temperature above that at which steam will condense to absorb substantially all of the solvent from the vapors, and cycling said residue and absorbed solvent to the distilling step.

7. In solvent refining of petroleum oils wherein a charge oil is subjected to an extraction step by contact with a solvent which is of a character to form a constant boiling mixture with water, the steps which consist in steam distilling solvent from a solvent-oil mixture resulting from the extraction step to form constant boiling vapors of solvent and water, and to leave a petroleum oil residue, contacting the vapors with a part of said residue to absorb substantially all of the solvent from the vapors, and cycling the oil and absorbed solvent back to the distilling step.

8. In a solvent extraction and recovery system wherein a charge liquid is subjected to an extraction step by contact with a solvent liquid, the solvent being of a character to form a constant boiling mixture with water and having a relatively high proportion of solvent, the steps which consist in steam distilling the solvent from a mixture resulting from the extraction step to form a constant boiling vapor mixture of solvent and water, and contacting the vapor mixture with the charge liquid at a temperature above that at which steam will condense, to absorb substantially all of the solvent from the vapors.

9. In a solvent extraction and recovery system wherein a charge liquid is subjected to an extraction step by contact with furfural, said furfural forming a constant boiling mixture with water in which the solvent proportion is relatively high, the steps which consist in distilling the furfural from a mixture resulting from the extraction step, said distillation being effected in part with steam, whereby constant boiling vapors of furfural and water are formed, and contacting the vapors with charge liquid at a temperature above the condensing point of steam to absorb substantially all of the solvent from the vapors.

10. In solvent refining of petroleum oils, wherein a charge oil is subjected to an extraction step by contact with furfural which forms a constant boiling mixture with water, characterized by its relatively high composition of furfural, the steps which consist in steam distilling the furfural from a furfural-oil mixture, resulting from the extraction step, to form vapors of furfural and water, in which the proportion of furfural exceeds the amount normally present in a constant boiling mixture, and contacting the vapors with a charge oil at a temperature above that at which steam will condense, to reduce the solvent in the vapors to less than 1%.

11. In a solvent extraction and recovery system wherein a charge liquid is subjected to an extraction step by contact with a solvent liquid, the solvent being of a character to form a constant boiling mixture with water and having a relatively low proportion of solvent, the steps which consist in steam distilling the solvent from a mixture resulting from the extraction step to form a constant boiling vapor mixture of solvent and water, and contacting the vapor mixture with the charge liquid at a temperature above that at which steam will condense, to absorb substantially all of the solvent from the vapors.

12. In a solvent extraction and recovery system wherein a charge liquid is subjected to an extraction step by contact with cresol, said cresol forming a constant boiling mixture with water in which the solvent proportion is relatively high, the steps which consist in distilling the cresol from a mixture resulting from the extraction step, said distillation being effected in part with steam, whereby constant boiling vapors of cresol and water are formed, and contacting the vapors with charge liquid at a temperature above the condensing point of steam to absorb substantially all of the solvent from the vapors.

EUGENE R. SMOLEY.